US012565344B2

(12) United States Patent (10) Patent No.: US 12,565,344 B2
Fujita et al. (45) Date of Patent: Mar. 3, 2026

(54) FLIGHT VEHICLE AND FLIGHT VEHICLE SYSTEM WITH POWER RECEIVING COIL PROVIDED ON OR IN LANDING PORTION OF LEG

(71) Applicant: NIDEC CORPORATION, Kyoto (JP)

(72) Inventors: Naoki Fujita, Kyoto (JP); Junichi Shimizu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/769,677

(22) Filed: Jul. 11, 2024

(65) Prior Publication Data

US 2025/0019099 A1 Jan. 16, 2025

(30) Foreign Application Priority Data

Jul. 14, 2023 (JP) ................................. 2023-115618

(51) Int. Cl.
| | |
|---|---|
| *B64U 50/38* | (2023.01) |
| *B60L 50/60* | (2019.01) |
| *B60L 53/126* | (2019.01) |
| *B64U 101/60* | (2023.01) |
| *H02J 50/12* | (2016.01) |

(52) U.S. Cl.
CPC .............. *B64U 50/38* (2023.01); *B60L 50/60* (2019.02); *B60L 53/126* (2019.02); *H02J 50/12* (2016.02); *B60L 2200/10* (2013.01); *B64U 2101/60* (2023.01)

(58) Field of Classification Search
CPC ........ B64U 50/00; B64U 50/35; B64U 50/37; B64U 50/38; B64U 80/25; B64U 2101/60; B64U 2101/61
See application file for complete search history.

(56) References Cited

U.S. PATENT DOCUMENTS

| | | | | |
|---|---|---|---|---|
| 9,896,203 | B1 * | 2/2018 | Kim ........................ | B64D 27/24 |
| 10,023,057 | B2 * | 7/2018 | Sobota Rodriguez .. | B60L 53/30 |
| 10,618,651 | B2 * | 4/2020 | Waters .................... | H02J 50/10 |
| 11,167,653 | B2 * | 11/2021 | Kodaira ................. | B64U 50/19 |
| 11,174,848 | B1 * | 11/2021 | Rutland ................. | B64C 25/20 |
| 11,701,976 | B2 * | 7/2023 | Waters ................... | B64U 50/38 |
| | | | | 320/108 |
| 12,116,114 | B2 * | 10/2024 | Yamato ................... | B60L 15/20 |
| 2018/0237161 | A1 * | 8/2018 | Minnick ................ | B64U 50/37 |
| 2018/0257502 | A1 * | 9/2018 | Park ........................ | B60L 53/36 |

(Continued)

FOREIGN PATENT DOCUMENTS

| | | | | | |
|---|---|---|---|---|---|
| CN | 106275381 A | * | 1/2017 | .......... | B64C 1/1415 |
| JP | 2016-210229 A | | 12/2016 | | |

*Primary Examiner* — Arfan Y. Sinaki

(74) *Attorney, Agent, or Firm* — Keating & Bennett, LLP

(57) ABSTRACT

A flight vehicle includes a driver, a battery, a main body, a leg, and an annular power receiving coil. The driver is operable to rotate a rotor blade about a rotation axis. The battery is chargeable/dischargeable and supplies power to the driver. The main body accommodates the battery. The leg supports the main body during landing. The power receiving coil is electrically connected to the battery. The leg includes a landing portion that contacts the landing surface during landing. At the time of landing, the central axis of the power receiving coil extends parallel or substantially parallel to a normal direction of the landing surface. The power receiving coil is located on or in the landing portion.

8 Claims, 2 Drawing Sheets

(56)          References Cited

U.S. PATENT DOCUMENTS

2021/0237868 A1*  8/2021  Yamato ................... B64C 25/54
2022/0134899 A1*  5/2022  Eide ....................... B64U 70/97
                                                                244/115

* cited by examiner

FLIGHT VEHICLE AND FLIGHT VEHICLE SYSTEM WITH POWER RECEIVING COIL PROVIDED ON OR IN LANDING PORTION OF LEG

CROSS-REFERENCE TO RELATED APPLICATIONS

The present invention claims priority under 35 U.S.C. § 119 to Japanese Patent Application No. 2023-115618, filed on Jul. 14, 2023, the entire contents of which are hereby incorporated herein by reference.

1. Field of the Invention

The present disclosure relates to flight vehicles and flight vehicle systems.

2. Background

Conventionally, there has been known a flight vehicle capable of taking off and landing, flying, and hovering by driving a rotary wing with electric power. For example, a multicopter flies by utilizing power supplied by a power supply wire from a ground station.

However, when power is supplied by wire as in the related art, a multicopter can fly only within a range of the length of the power supply wire, and the movement range is limited. On the other hand, if the battery is mounted on the multicopter, it is not necessary to supply electric power from the ground station by wire, so that the moving range of the multicopter can be expanded.

However, it is necessary to charge or replace the mounted battery as the state of charge decreases. In addition, since manual charging or replacement of the battery requires a lot of time and effort, automation is desired. However, in a case where a battery is charged by automatic wired connection with an external power supply, a device for wired connection and charging tends to be complicated and large. Similarly, in a case where the battery is automatically replaced, a device for replacing the battery tends to be complicated and large.

SUMMARY

An example embodiment of a flight vehicle of the present disclosure includes a driver, a battery, a main body, a leg, and an annular power receiving coil. The driver is operable to rotate a rotor blade about a rotation axis. The battery is chargeable/dischargeable and supplies power to the driver. The main body accommodates the battery. The leg supports the main body during landing. The power receiving coil is electrically connected to the battery. The leg includes a landing portion that contacts a landing surface during landing. At the time of landing, the central axis of the power receiving coil extends parallel or substantially parallel to the normal direction of the landing surface. The power receiving coil is on the landing portion.

An example embodiment of a flight vehicle system of the present disclosure includes the above-described flight vehicle and a power transmission. The power transmission includes a power transmission coil. The power transmission coil is operable to transmit power to the power receiving coil of the flight vehicle in a wireless manner.

The above and other elements, features, steps, characteristics and advantages of the present disclosure will become more apparent from the following detailed description of the example embodiments with reference to the attached drawings.

DETAILED DESCRIPTION

Example embodiments will be described with reference to the drawings hereinafter.

In the present specification, a direction Z appropriately illustrated in each drawing is referred to as an "up-down direction". In the up-down direction Z, the upper side of the sheet surface is referred to as an "upper side Zu" or "upward Zu", and the lower side of the sheet surface is referred to as a "lower side Zd" or "downward Zd". In a state where a flight vehicle 100 has landed on a landing surface fh parallel to the horizontal plane, the up-down direction Z is parallel to the vertical direction, the upper side Zu is a vertically upper side, and the lower side Zd is a vertically lower side. In each drawing, a direction around a predetermined axis parallel to the up-down direction Z such as a central axis Jc and a rotation axis Jr is referred to as a "circumferential direction".

In addition, in a positional relationship between any one of an azimuth, a line, and a plane and another, "parallel" includes not only a state in which both of them do not intersect at all no matter how long they extend, but also a state in which they are substantially parallel. In addition, "perpendicular" and "orthogonal" include not only a state in which both of them intersect each other at 90 degrees, but also a state in which they are substantially perpendicular and a state in which they are substantially orthogonal. In other words, each of "parallel", "perpendicular", and "orthogonal" includes a state in which the positional relationship between the two of them permits an angular deviation to a degree not departing from the spirit of the present disclosure. It is to be noted that the above names are names used merely for description, and are not intended to limit actual positional relationships, directions, names, and the like.

Figure 1:
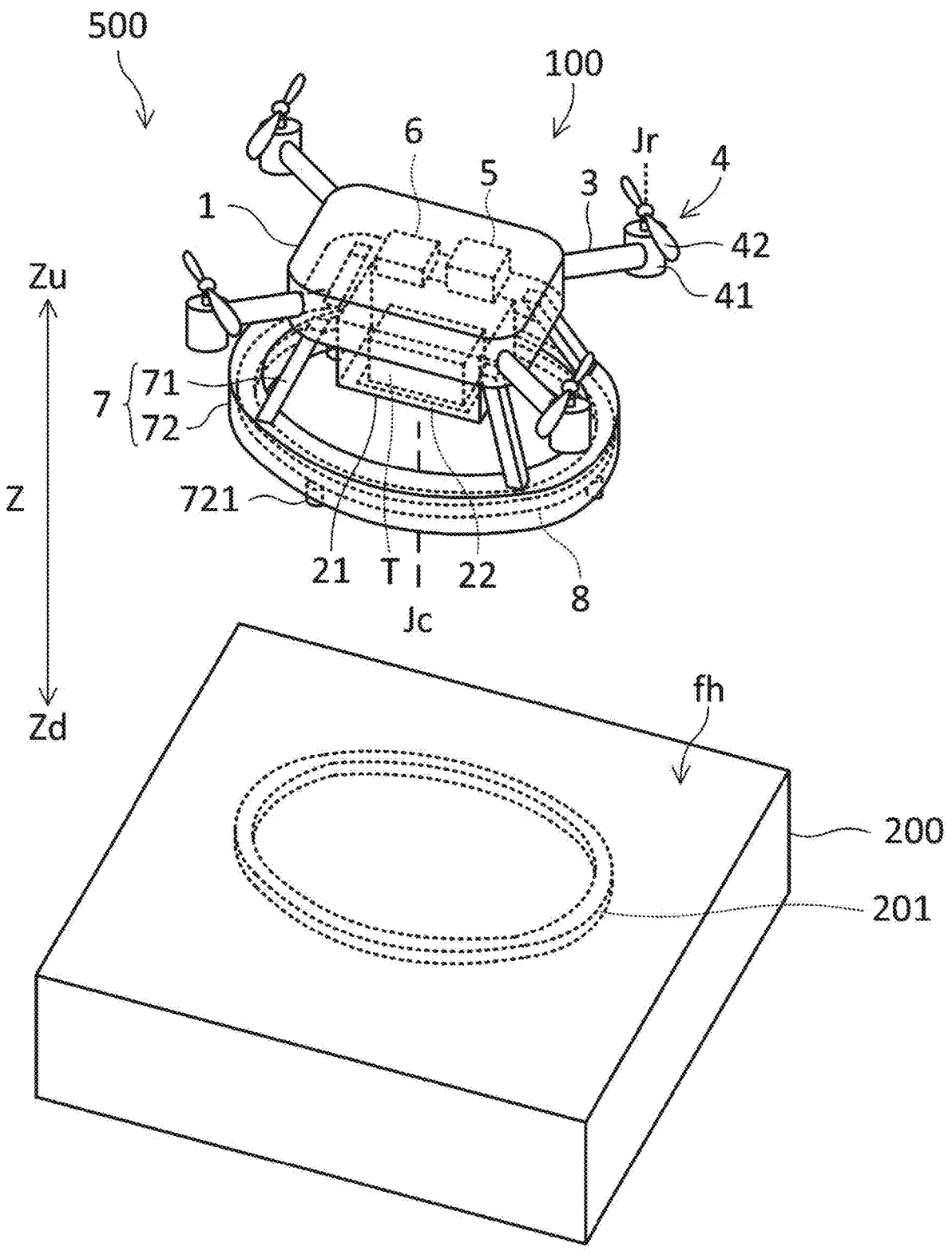
FIG. 1 is a schematic perspective view illustrating a configuration example of a flight vehicle system according to an example embodiment of the present disclosure.
Figure 2:
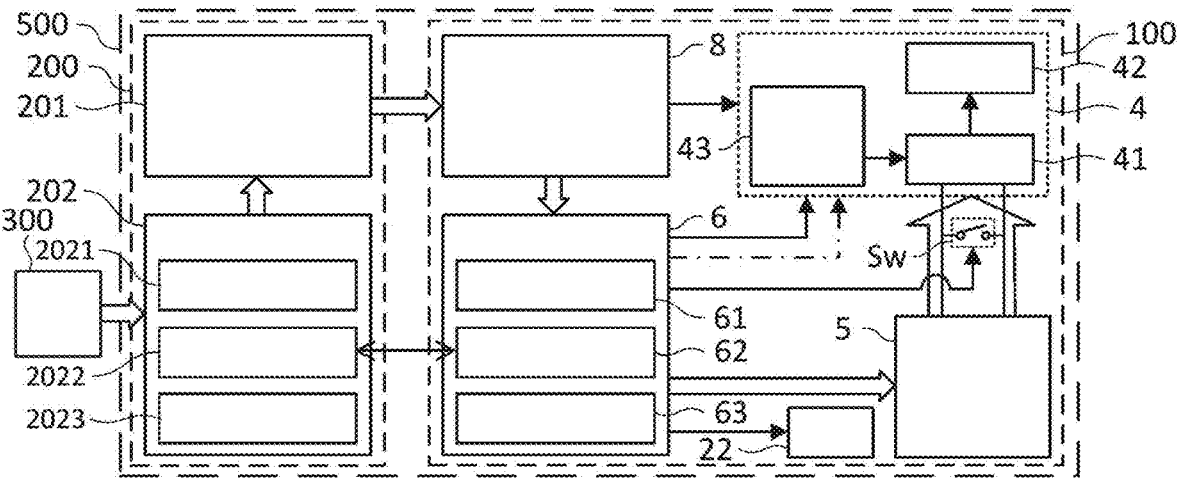
FIG. 2 is a block diagram illustrating a configuration example of a flight vehicle system according to an example embodiment of the present disclosure.

FIG. 1 is a schematic perspective view illustrating a configuration example of a flight vehicle system 500 according to an example embodiment. FIG. 2 is a block diagram illustrating a configuration example of the flight vehicle system 500. As illustrated in FIGS. 1 and 2, the flight vehicle system 500 includes a flight vehicle 100 and a power transmission device 200. The power transmission device 200 includes a power transmission coil 201 capable of transmitting power in a wireless manner to a power receiving coil 8, which will be described later, of the flight vehicle 100. In addition, power is supplied from an external power supply 300 to the power transmission device 200. The power supply 300 may be a DC power supply or an AC power supply supplied from a commercial power network or the like. According to the flight vehicle system 500, as will be described later, charging of the battery 5, to be described later, mounted on the flight vehicle 100 can be automated with a simple configuration. In addition, power reception efficiency of the flight vehicle 100 by the wireless power transfer can be improved.

In the present example embodiment, the power transmission device 200 is disposed on a horizontal ground or a floor surface, but may be installed on an upper surface of a predetermined object. A landing surface fh on which the flight vehicle 100 can take off and land is disposed in the power transmission device 200. In the present example embodiment, the landing surface fh is parallel to the horizontal plane, and the upper surface of the power transmission device 200 serves as the landing surface fh.

As illustrated in FIG. 1, the power transmission coil 201 has an annular shape centered on an axis (not illustrated) parallel to the up-down direction Z. In the present example embodiment, the shape is a circular shape. However, the present disclosure is not limited to this example. The annular power transmission coil 201 may have, for example, an elliptical shape or an n-angular shape (n is a plural number of 3 or more) when viewed from the up-down direction Z.

The power transmission coil 201 is disposed away from the landing surface fh of the power transmission device 200 toward the lower side Zd. In the present example embodiment, the power transmission coil 201 is incorporated in the main body of the power transmission device 200. However, the present disclosure is not limited to this example, and at least a part of the power transmission coil 201 may be exposed from the main body of the power transmission device 200.

As illustrated in FIG. 2, the power transmission device 200 further includes a controller 202. The controller 202 controls each component of the power transmission device 200. The controller 202 includes a power transmission power supply unit 2021, a power transmission communication unit 2022, and a power transmission controller 2023. The power transmission power supply unit 2021 outputs electric power supplied from the power supply 300 to the power transmission coil 201 on the basis of the control by the power transmission controller 2023. The power transmission communication unit 2022 includes, for example, an infrared sensor and the like, and receives a communication signal such as infrared light output from a power reception communication unit 62 to be described later disposed in the flight vehicle 100. In addition, the power reception communication unit 62 of the flight vehicle 100 may receive a communication signal output from the power transmission communication unit 2022. The power transmission controller 2023 controls wireless power transfer to the flight vehicle 100 by the power transmission coil 201 on the basis of a communication signal transmitted and received between the power transmission communication unit 2022 and the power reception communication unit 62.

Next, a configuration example of the flight vehicle 100 will be described with reference to FIGS. 1 and 2. The flight vehicle 100 can take off and land and can fly in a state of holding a transported object T.

The flight vehicle 100 includes a main body 1, a luggage room 21, a door 22, an arm 3, a drive assembly 4, a battery 5, a controller 6, a leg 7, and a power receiving coil 8. In the following description, unless otherwise specified, the relative positional relationship between the components of the flight vehicle 100 is based on a state in which the flight vehicle 100 lands on the horizontal landing surface fh.

The main body 1 is a body of the flight vehicle 100, and houses the controller 6, the battery 5, and the like. As described above, the flight vehicle 100 includes the main body 1. A space to hold the transported object T is secured on the lower side Zd relative to the main body 1. Preferably, the space to hold the transported object T is arranged on the upper side Zu relative to the lower end of a landing portion

72, to be described later, of the leg 7. This prevents the transported object T from coming into contact with the landing surface fh when the flight vehicle 100 lands. Therefore, even in a state of holding the transported object T, the flight vehicle 100 can land on the landing surface fh in a safe and stable state.

For example, the luggage room 21 is disposed on the lower side Zd of the main body 1. As described above, the flight vehicle 100 includes the luggage room 21. The luggage room 21 can accommodate the transported object T. In the present example embodiment, the internal space of the luggage room 21 is the above-described space to hold the transported object T. The luggage room 21 is preferably located on the upper side Zu relative to the landing portion 72 of the leg 7, and more preferably on the upper side Zu relative to the lower end of the landing portion 72. Accordingly, when the flight vehicle 100 lands, the luggage room 21 does not contact the landing surface fh. Accordingly, the flight vehicle 100 can land on the landing surface fh in a safe and stable state.

On the lower surface of the luggage room 21, an openable/closable door 22 is disposed. As described above, the flight vehicle 100 includes the door 22. The transported object T can pass through the door 22 in an open state. Preferably, the door 22 is located on the upper side Zu relative to the lower end of the landing portion 72 regardless of the open/close state. For example, even in the open state, the door 22 is located on the upper side Zu relative to the lower end of the landing portion 72 of the leg 7. With this configuration, the flight vehicle 100 can open the door 22 in a landed state and unload the transported object T by the gravity. Therefore, at the time of unloading the transported object T, it is possible to reduce or prevent a damage given to the transported object T. On the other hand, in the configuration in which at least a lower portion of the door 22 in the open state is located on the lower side Zd relative to the lower end of the landing portion 72, it is necessary to open the door 22 in a state of being separated upward Zu from the landing surface fh of the destination (that is, in a hovering state) to drop the transported object T. Therefore, there is a possibility that a falling damage is caused to the transported object T. However, this example does not exclude a configuration in which at least a part of the door 22 is located at the same height as the lower end of the landing portion 72 or on the lower side Zd relative to the landing portion 72.

Note that the door 22 may be single-sided or double-sided. The door 22 may be of a hinged door type, a sliding door type, or a folding door type. In particular, in the sliding door type, the door 22 can be opened and closed by sliding in a direction intersecting the up-down direction Z. In this way, for example, as compared with a hinged-type door that opens outward, even if the door 22 is brought close to the landing portion 72 in the up-down direction Z, the door 22 in the open state does not come into contact with the landing surface fh. Therefore, the flight vehicle 100 can unload the transported object T in a landed state. Therefore, the size of the flight vehicle 100 can be reduced, and in particular, the size in the up-down direction Z can be reduced.

In addition, the above example does not exclude a configuration in which the flight vehicle 100 does not include the luggage room 21 and the door 22. For example, the space to hold the transported object T may be an open space on the lower side Zd of the main body 1. In this case, a mechanism for stably holding the transported object T by means such as gripping is provided below the main body 1.

A plurality of arms 3 extend from an outer surface of the main body 1 in a direction intersecting the up-down direction Z (for example, in a direction parallel to the horizontal plane), and are arranged along the outer surface of the main body 1. Each arm 3 connects the drive assembly 4 to the main body 1. For example, the drive assembly 4 is disposed at the distal end of each arm 3 extending from the main body 1. Note that the number of arms 3 and the number of drive assemblies 4 are four in the present example embodiment, but are not limited to this example. The number thereof may be a plural number other than four.

The drive assembly 4 rotates a rotor blade 42 about the rotation axis Jr. As described above, the flight vehicle 100 includes the drive assembly 4. Each drive assembly 4 includes a motor 41 and the rotor blade 42. The motor 41 is incorporated in a motor housing (reference numeral is omitted) connected to the distal end of the arm 3. The rotor blade 42 is fixed to a shaft (reference numeral is omitted) of the motor 41 extending along the rotation axis Jr parallel to the up-down direction Z, and is rotatable about the rotation axis Jr. The motor 41 rotates the shaft to thereby rotate the rotor blade 42 about the rotation axis Jr. When the rotor blade 42 rotates, the flight vehicle 100 obtains buoyancy from the drive assembly 4, and also obtains a propulsive force in a direction orthogonal to the up-down direction Z. Note that the rotation axis Jr is not limited to the above example, and may extend in a direction other than the up-down direction Z. For example, the rotation axis Jr may extend in a direction obliquely intersecting the up-down direction Z or in a direction orthogonal thereto. The rotation axes Jr of the rotor blades 42 may extend in different directions.

As illustrated in FIG. 2, each drive assembly 4 further includes a motor controller 43. The motor controller 43 outputs electric power supplied from the battery 5 to the motor 41 on the basis of information output from the controller 6.

The battery 5 is a charge/discharge device disposed in the main body 1, and is a lithium ion battery in the present example embodiment. However, the present disclosure is not limited to this example, and the battery 5 may be a secondary battery other than a lithium ion battery. As described above, the flight vehicle 100 includes the battery 5. The chargeable/dischargeable battery 5 is electrically connected to the drive assembly 4, and supplies power to the drive assembly 4 (in particular, the motor 41). In the present example embodiment, the flight vehicle 100 includes a single battery 5. However, the present disclosure is not limited to this example, and the flight vehicle 100 may include a plurality of batteries 5. Furthermore, an individual battery 5 may be disposed for each drive assembly 4.

The controller 6 controls each component of the flight vehicle 100, and controls, for example, the drive assembly 4, the battery 5, and the like. As described above, the flight vehicle 100 includes the controller 6. The controller 6 also controls opening and closing of the door 22. Specifically, the controller 6 opens the door 22 when the transported object T is loaded and stored in the luggage room 21, closes the door 22 when the transported object T is held in the luggage room 21, and opens the door 22 when the transported object T is unloaded from the luggage room 21. In a state where the door 22 is closed, the transported object T can be accommodated and held in the luggage room 21. On the other hand, in a state where the door 22 is opened, the transported object T can be loaded into and unloaded from the luggage room 21. Therefore, for example, the flight vehicle 100 can fly in a state where the transported object T is held in the luggage room 21 with the door 22 being closed by the controller 6, and when arriving at the destination, the flight vehicle can unload the transported object T from the luggage room 21 with the door 22 being opened by the controller 6.

As illustrated in FIG. 2, the controller 6 includes a power reception controller 61, the power reception communication unit 62, and a battery controller 63. The power reception controller 61 controls power supply made by wireless power transfer. The power reception communication unit 62 communicates with the power transmission communication unit 2022. The battery controller 63 controls the battery 5.

The power reception communication unit 62 may communicate with the power transmission communication unit 2022 constantly or at predetermined intervals. The power reception communication unit 62 includes a light source that emits infrared light for communication or the like, and emits infrared light. In addition, the power reception communication unit 62 includes a light receiving sensor, and receives infrared light emitted by the power transmission communication unit 2022. For example, the power reception communication unit 62 transmits a power supply start request signal and a power supply stop request signal to the power transmission device 200 on the basis of the control by the power reception controller 61. The power transmission device 200 controls energization to the power transmission coil 201 in response to reception of these signals.

Note that the power reception communication unit 62 may receive power receiving state information indicating a state of power reception by the power receiving coil 8, from the power transmission communication unit 2022. In addition, the power transmission communication unit 2022 and the power reception communication unit 62 are not limited to adopt the method using infrared light, and other methods such as wireless communication may be adopted. The flight vehicle 100 performs hovering, horizontal movement, rotational movement, and the like on the basis of the power receiving state information received by the power reception communication unit 62. That is, when the motor controller 43 controls the motor 41 based on the power receiving state information indicating a state of power reception by the power receiving coil 8, the flight vehicle 100 moves.

The battery controller 63 outputs the power supplied from the power receiving coil 8 to the battery 5 on the basis of the control by the power reception controller 61. In addition, the battery controller 63 controls start and stop of charging of the battery 5.

At least a part of the power supplied from the power receiving coil 8 may be directly output to the drive assembly 4 as indicated by an alternate long and short dash line in FIG. 2. In this case, the controller 6 determines and controls whether to supply power from the battery 5 to the drive assembly 4 or to supply power from the power receiving coil 8 to the drive assembly 4. For example, in the case of driving the drive assembly 4 in a state where wireless power transfer is possible, the controller 6 may output a part of the power supplied from the power receiving coil 8 to the drive assembly 4 and output the remaining part to the battery 5. In addition, the controller 6 may output the power supplied from the power receiving coil 8 to the drive assembly 4 when the charging rate of the battery 5 is equal to or higher than a predetermined threshold value in a state where the wireless power transfer is possible.

The leg 7 is disposed on the lower side Zd of the main body 1 and is connected to the main body 1. The leg 7 supports the main body 1 when the flight vehicle 100 lands.

As described above, the flight vehicle 100 includes the leg 7. The leg 7 includes a connection part 71 and the landing portion 72.

The connection part 71 extends at least downward Zd from the lower portion of the main body 1 and is connected to the landing portion 72. The number of the connection parts 71 is preferably plural, and more preferably, three or more. However, this example does not exclude a configuration in which the number of connection parts 71 is one.

The landing portion 72 contacts the landing surface fh when the flight vehicle 100 lands. As described above, the leg 7 has the landing portion 72. The landing portion 72 has an annular shape centered on the central axis Jc parallel to the up-down direction Z. In the present example embodiment, the shape is a circular shape. However, the present disclosure is not limited to this example, and the annular landing portion 72 may have, for example, an elliptical shape or an n-angular shape (n is a plural number of 3 or more) when viewed from the up-down direction Z.

In the present example embodiment, the landing portion 72 holds the power receiving coil 8. Preferably, when viewed from the up-down direction Z, the landing portion 72 has an annular shape along the power receiving coil 8 and surrounds the luggage room 21. Accordingly, it is possible to easily load and unload the transported object T into and from the luggage room 21. In particular, the transported object T can be unloaded from the luggage room 21 without hitting the landing portion 72.

On the lower surface of the landing portion 72, three or more protrusions 721 protruding downward Zd are disposed. That is, the landing portion 72 has three or more protrusions 721. The three or more protrusions 721 are arranged in the circumferential direction around the central axis Jc. Accordingly, when the flight vehicle 100 lands, the three or more protrusions 721 are brought into contact with the landing surface fh, so that the flight vehicle 100 can be placed on the landing surface fh in a stable state.

The power receiving coil 8 is a coil for wireless power transfer. As described above, the flight vehicle 100 includes the power receiving coil 8. The power receiving coil 8 is electrically connected to the battery 5. The power receiving coil 8 has an annular shape centered on the central axis Jc parallel to the up-down direction Z. At the time of landing of the flight vehicle 100, the central axis Jc of the power receiving coil 8 extends parallel to the normal direction of the landing surface fh.

Thus, the central axis Jc of the power receiving coil 8 is parallel to the central axis of the power transmission coil 201 incorporated immediately below the landing surface fh, for example. Therefore, the magnetic field or the electric field formed by the power transmission coil 201 on the landing surface fh side can efficiently act on the power receiving coil 8 of the flight vehicle 100. Therefore, the battery 5 can be charged by the wireless power transfer between the power transmission coil 201 and the power receiving coil 8. Therefore, charging of the battery 5 mounted on the flight vehicle 100 can be automated with a simple configuration. In addition, it is possible to improve the power reception efficiency of the power receiving coil 8 by the wireless power transfer from the power transmission coil 201. That is, the feeding efficiency of the flight vehicle 100 by the wireless power transfer can be improved, and the battery 5 can be efficiently charged.

Further, the power receiving coil 8 is disposed on the landing portion 72. Accordingly, when the flight vehicle 100 lands, the distance between the power receiving coil 8 and the power transmission coil 201 disposed immediately below the landing surface fh can be further reduced. Therefore, the power receiving efficiency of the power receiving coil 8 by the wireless power transfer can be further improved, and the battery 5 can be charged more efficiently. In addition, it is not necessary to secure an arrangement space for the power receiving coil 8 separately from the landing portion 72. Accordingly, the size and weight of the flight vehicle 100 can be reduced.

In the present example embodiment, the power receiving coil 8 has a circular shape when viewed from the up-down direction Z. Thus, the power receiving coil 8 can be produced by winding the conductive wire into a circular shape. Therefore, the power receiving coil 8 can be easily created. However, the present disclosure is not limited to this example, and the annular landing portion 72 may have, for example, an elliptical shape or an n-angular shape (n is a plural number of 3 or more) when viewed from the up-down direction Z. In the present example embodiment, the power receiving coil 8 has an annular shape having the same shape as the power transmission coil 201 and the landing portion 72. However, the present disclosure is not limited to this example, and the power receiving coil 8 may have an annular shape having a shape different from at least one of the power transmission coil 201 and the landing portion 72. In addition, the number of power receiving coils 8 is single in the present example embodiment, but may be plural. For example, in the landing portion 72, the plurality of power receiving coils 8 may be arranged concentrically.

Preferably, the power receiving coil 8 is built in the landing portion 72. For example, the power receiving coil 8 is integrally formed with the landing portion 72 by insert molding or the like. In this way, the power receiving coil 8 can be easily disposed on the landing portion 72. However, the arrangement means of the power receiving coil 8 with respect to the landing portion 72 is not limited to this example. For example, a part or whole of the power receiving coil 8 may be exposed from the landing portion 72. For example, the landing portion 72 itself may be the power receiving coil 8. In this case, the protrusions 721 are disposed on a lower surface of the power receiving coil 8.

When a magnetic field generated by the electric current flowing through the power transmission coil 201 acts on the power receiving coil 8, the electric current flows through the power receiving coil 8. Thus, the power can be supplied from the power receiving coil 8 to the battery 5, and the battery 5 can be charged. Therefore, by bringing the flight vehicle 100 close to the power transmission coil 201 of the power transmission device 200, wireless power transfer can be made by the power receiving coil 8 and the power transmission coil 201 without connecting the battery 5 to an external power supply or the like. In addition, since wireless power transfer can be made by the power receiving coil 8 and the power transmission coil 201, the structure of the flight vehicle 100 and the structure of the power transmission device 200 can be simplified. Therefore, charging of the battery 5 can be automated with a simple structure and control.

In addition, for example, in the configuration in which the battery 5 of the flight vehicle 100 and an external power supply are connected by wire, a terminal connecting the battery 5 and the external power supply may be exposed to the outside. Therefore, when the external power supply is installed outdoors, the terminal may get wet with rain or the like, which may cause a problem in charging of the battery 5. On the other hand, in the wireless power transfer, since it is not necessary to connect the battery 5 to an external power supply in a wired manner, it is not necessary to expose the terminal to the outside. Therefore, even if the power transmission device 200 is installed outdoors, the battery 5 can be suitably charged. In addition, since the charging of the battery 5 can be automated, the battery 5 can be charged in a place where the flight vehicle 100 can move even in a place where it is difficult for a person to enter.

For example, the flight vehicle 100 can charge the battery 5 by overlapping at least a part of the power receiving coil 8 with the power transmission coil 201 when viewed from the up-down direction Z in a state of hovering at a position away from the upper surface of the power transmission device 200 toward the upper side Zu. As a result, the battery 5 can be easily charged even when the transported object T mounted in the space on the lower Zd side relative to the main body 1 is unloaded from the space to the lower Zd side by the gravity. Note that the flight vehicle 100 can also charge the battery 5 in a state of landing on the landing surface fh of the power transmission device 200.

In the present example embodiment, the power receiving coil 8 and the power transmission coil 201 are coils for wireless power transfer by a magnetic field resonance system. In the case of using wireless power transfer by the magnetic field resonance system, when the power receiving coil 8 is brought close to the power transmission coil 201, an electric current can be generated in the power receiving coil 8 regardless of the relative orientation between the power receiving coil 8 and the power transmission coil 201. Therefore, it is easy to charge the battery 5 regardless of the attitude of the flight vehicle 100 with respect to the power transmission device 200 and the attitude of the power receiving coil 8 with respect to the flight vehicle 100. As a result, even when the accuracy of the position control of the flight vehicle 100 is relatively low, it is easy to charge the battery 5 by simply bringing the flight vehicle 100 close to the power transmission device 200. Accordingly, automatic charging of the battery 5 can be achieved by simpler control of the flight vehicle 100.

However, the present disclosure is not limited to this example, and the power receiving coil 8 and power transmission coil 201 may be coils for wireless power transfer other than the magnetic field resonance system. The power receiving coil 8 and the power transmission coil 201 may be, for example, electromagnetic induction type coils for wireless power transfer or radio wave reception type coils for wireless power transfer. In the magnetic field resonance system, the power can be supplied even if the power receiving coil 8 and the power transmission coil 201 are misaligned. Therefore, even when the power receiving coil 8 is located outside the outer edge of the power transmission coil 201, power can be supplied. The flight vehicle 100 does not necessarily have to land within the outer edge of the power transmission coil 201.

Further, an outer diameter of the power receiving coil 8 as viewed from the up-down direction Z is preferably equal to or smaller than an inner diameter of the power transmission coil 201 as viewed from the up-down direction Z, and more preferably, smaller than the inner diameter. Consequently, when the flight vehicle 100 is brought close to the power transmission device 200, the power receiving coil 8 is easily put into the magnetic field generated by the power transmission coil 201, and the electric current is easily generated in the power receiving coil 8. In addition, it is easy to arrange the entire power receiving coil 8 inside the inner edge of the power transmission coil 201 when viewed from the up-down direction Z. Therefore, the power receiving efficiency of the power receiving coil 8 by the wireless power transfer can be further improved. However, this example does not exclude a configuration in which the outer diameter of the power receiving coil 8 as viewed from the up-down direction Z is larger than the inner diameter of the power transmission coil 201 as viewed from the up-down direction Z.

In addition, as illustrated in FIG. 2, the flight vehicle 100 may further include a switching circuit Sw. The switching circuit Sw is provided between two wires that connect the two terminals of the battery 5 and the two terminals of the motor 41, respectively. The switching circuit Sw is ON/OFF controlled by the controller 6. The switching circuit Sw connects the two wires in the ON state. As a result, the switching circuit Sw connects the terminals of the motor 41 and short-circuits them in the ON state. Therefore, turning the switching circuit Sw on can prevent the motor 41 from rotating. As a result, when the motor 41 is stopped and the battery 5 is charged, it is possible to suppress the motor 41 from malfunctioning due to the magnetic field generated by the power transmission coil 201. However, this example does not exclude a configuration in which the flight vehicle 100 does not include the switching circuit Sw.

The example embodiment of the present disclosure has been described above. It is to be noted that the scope of the present disclosure is not limited to the above-described example embodiment. The present disclosure can be implemented by adding various modifications to the above-described example embodiment within a range not departing from the spirit of the disclosure. In addition, the matters described in the above-described example embodiment can be arbitrarily combined together as appropriate within a range where no inconsistency occurs.

The example embodiment described above will be collectively described below.

For example, a flight vehicle disclosed herein includes: a drive assembly that rotates a rotor blade about a rotation axis; a battery that is chargeable/dischargeable and supplies power to the drive assembly; a main body that accommodates the battery; a leg that supports the main body during landing; and a power receiving coil having an annular shape and electrically connected to the battery. The leg includes a landing portion that contacts a landing surface during landing. At the time of landing, a central axis of the power receiving coil extends parallel to a normal direction of the landing surface. The power receiving coil is located on or in the landing portion (first configuration).

Note that the flight vehicle having the first configuration may have a configuration in which the power receiving coil has a circular shape (second configuration).

Further, the flight vehicle having the first or second configuration may be a flight vehicle capable of taking off and landing and capable of flying in a state of holding a transported object, and may have a configuration in which the space to hold the transported object is provided above the lower end of the landing portion (third configuration).

Further, the flight vehicle having any one of the first to third configurations may be configured to further include a luggage room provided on an upper side relative to the landing portion and capable of housing a transported object, a door through which the transported object is capable of passing, the door being is openable and closable and located on a lower surface of the luggage room, and a controller that controls opening and closing of the door (fourth configuration).

Further, the flight vehicle of the fourth configuration may be configured such that the door is located on an upper side relative to the lower end of the landing portion regardless of an open/close state (fifth configuration).

Further, the flight vehicle having the fourth or fifth configuration nay be configured such that the door is openable and closable by sliding in a direction intersecting the up-down direction (sixth configuration).

Further, the flight vehicle having any one of the fourth to sixth configurations may be configured such that the power receiving coil is located on or in the landing portion, and when viewed from the up-down direction, the landing portion has an annular shape along the power receiving coil and surrounds the luggage room (seventh configuration).

Further, the flight vehicle having any one of the first to seventh configurations may be configured such that three or more protrusions protruding downward are located on a lower surface of the landing portion (eighth configuration).

Further, a flight vehicle system disclosed in the present specification is configured to include the flight vehicle having any one of the first to eighth configurations, and a power transmission device including a power transmission coil capable of transmitting power in a wireless manner to the power receiving coil of the flight vehicle (ninth configuration).

The present disclosure is useful for a flight vehicle that receives power by wireless power transfer, and a system including the flight vehicle.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A flight vehicle comprising:
a driver to rotate a rotor blade about a rotation axis;
a battery that is chargeable and dischargeable and operable to supply power to the driver;
a main body that accommodates the battery;
a leg to support the main body during landing;
a power receiving coil with an annular shape and electrically connected to the battery;
a luggage room capable of housing a transported object;

a door through which the transported object is capable of passing, the door being openable and closable and located on a lower surface of the luggage room; and
a controller configured or programmed to control opening and closing of the door;
wherein
the leg includes a landing portion to contact a landing surface during landing;
a central axis of the power receiving coil extends parallel or substantially parallel to an axial direction of the flight vehicle;
the power receiving coil is located on or in the landing portion; and
an area inside the annular shape of the power receiving coil is larger than a total area of the luggage room.

2. The flight vehicle according to claim 1, wherein the luggage room is provided between the landing portion and the main body in an axial direction of the flight vehicle.

3. The flight vehicle according to claim 1, wherein the door is located above a lower end of the landing portion regardless of the door being in an open or closed state.

4. The flight vehicle according to claim 1, wherein the door is openable and closable by sliding in a direction intersecting an up-down direction.

5. The flight vehicle according to claim 1, wherein
the power receiving coil is located on or in the landing portion; and
when viewed from an up-down direction, the landing portion has an annular shape along the power receiving coil and surrounds the luggage room.

6. The flight vehicle according to claim 1, wherein three or more protrusions protruding downward are located on a lower surface of the landing portion.

7. A flight vehicle system comprising:
the flight vehicle according to claim 1; and
a power transmission including a power transmission coil capable of transmitting power in a wireless manner to the power receiving coil of the flight vehicle.

8. The flight vehicle according to claim 1, wherein
the controller is housed within the main body; and
the main body has a larger area than an area of the luggage room.

* * * * *